United States Patent [19]

Fjällström et al.

[11] Patent Number: 5,124,029
[45] Date of Patent: Jun. 23, 1992

[54] METHOD OF AND DEVICE FOR FRACTIONATING SUSPENSIONS

[75] Inventors: Roland Fjällström, Lawrenceville, Ga.; Rune Frykhult, Stockholm, Sweden

[73] Assignee: Celleco AB, Stockholm, Sweden

[21] Appl. No.: 543,807

[22] PCT Filed: Nov. 7, 1989

[86] PCT No.: PCT/SE89/00633
§ 371 Date: Jul. 23, 1990
§ 102(e) Date: Jul. 23, 1990

[87] PCT Pub. No.: WO90/06396
PCT Pub. Date: Jun. 14, 1990

[30] Foreign Application Priority Data
Nov. 25, 1988 [SE] Sweden ............ 8804264

[51] Int. Cl.$^5$ .......... B07B 1/08; B07B 1/50; D21D 5/02
[52] U.S. Cl. .......... 209/250; 209/271; 209/380; 210/327; 210/391; 210/797; 210/798
[58] Field of Search .......... 209/250, 268–273, 209/350, 359, 361, 379, 380; 162/55; 210/780, 791, 797, 798, 327, 334, 333.01, 391, 393

[56] References Cited

U.S. PATENT DOCUMENTS

| | | | |
|---|---|---|---|
| 873,390 | 12/1907 | Stevenson et al. | 209/271 X |
| 1,041,935 | 10/1912 | Worrall | 209/271 |
| 1,155,116 | 9/1915 | Westbye | 209/273 |
| 1,675,612 | 7/1928 | Laird | 209/380 X |
| 2,874,840 | 2/1959 | Simpson | 209/250 |
| 2,988,223 | 6/1961 | Janson | 209/250 UX |
| 3,007,575 | 11/1961 | Sylvest | 209/380 X |
| 3,024,911 | 3/1962 | Janson | 209/268 |
| 3,477,571 | 11/1969 | Maag | 209/250 |
| 3,490,585 | 1/1970 | Gooding et al. | 209/270 X |
| 3,542,198 | 11/1970 | Borjeson | 210/334 X |
| 3,633,743 | 1/1972 | Gooding et al. | 209/250 |
| 3,827,567 | 8/1974 | Rundqvist | 209/250 X |
| 4,889,625 | 12/1989 | Nilsson | 210/391 X |
| 4,929,355 | 5/1990 | Ragnegard et al. | 210/780 X |

FOREIGN PATENT DOCUMENTS

| | | | |
|---|---|---|---|
| 2146022 | 3/1973 | Fed. Rep. of Germany | 209/271 |
| 0576724 | 5/1958 | Italy | 209/250 |
| 62-33897 | 2/1987 | Japan | 162/55 |
| 0029471 | 1/1909 | Sweden | 209/359 |
| 1505599 | 9/1989 | U.S.S.R. | 209/250 |

*Primary Examiner*—Michael S. Huppert
*Assistant Examiner*—Edward M. Wacyra
*Attorney, Agent, or Firm*—Davis Hoxie Faithfull & Hapgood

[57] ABSTRACT

A device for fractionating pulp suspensions has a series of vertical filter sheets attached to a horizontal shaft. Suspension is sprayed against the sheets to effect a separation of coarse and fine solids. Cleansing liquid is also sprayed against the sheets to keep the filter holes open and the fabric sheets are movable with respect to the sprays.

21 Claims, 11 Drawing Sheets

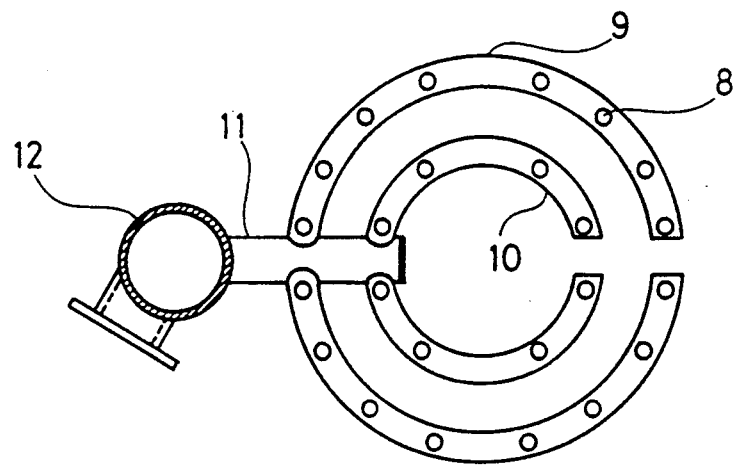
Fig. 7
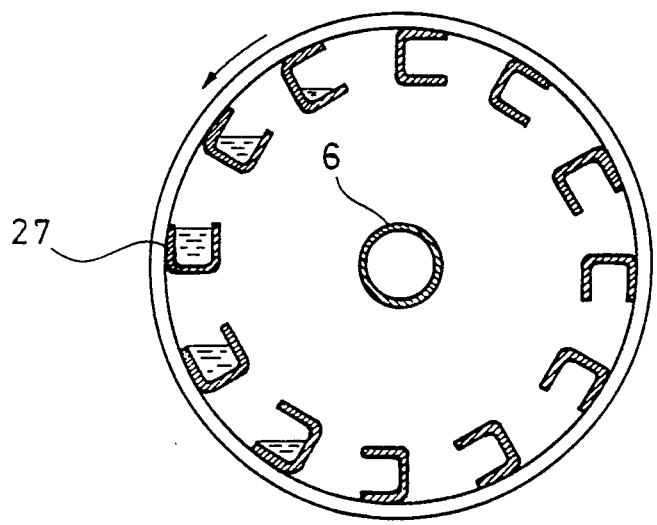
Fig. 8
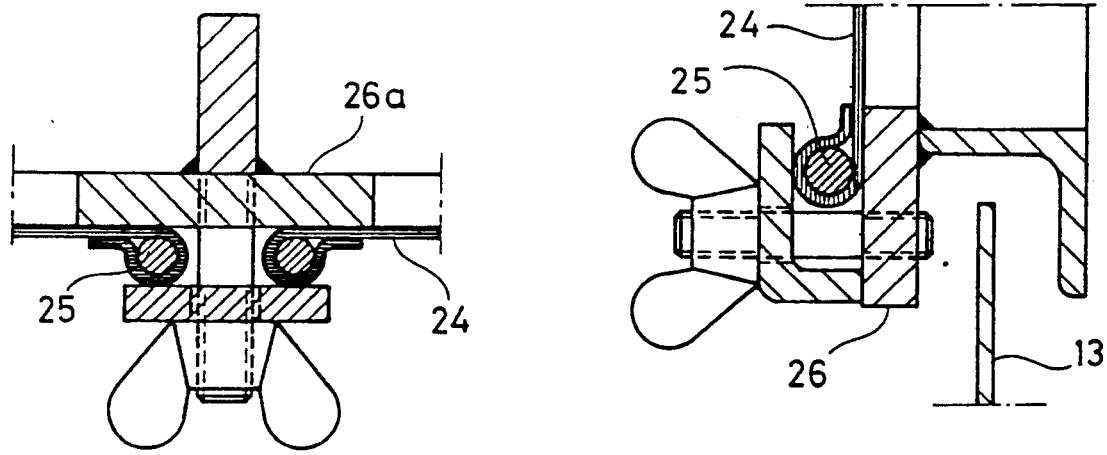
Fig. 9
Fig. 10

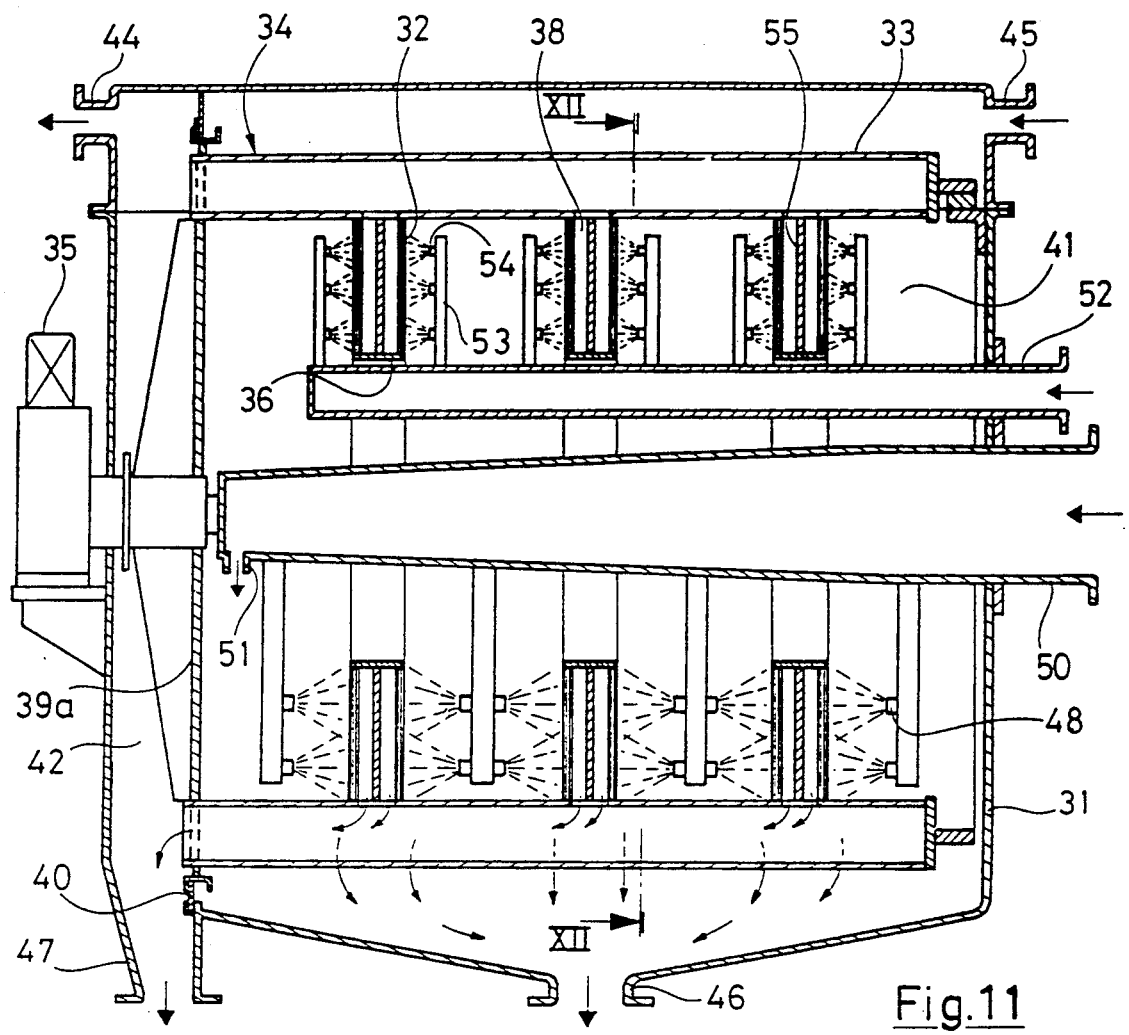
Fig. 11
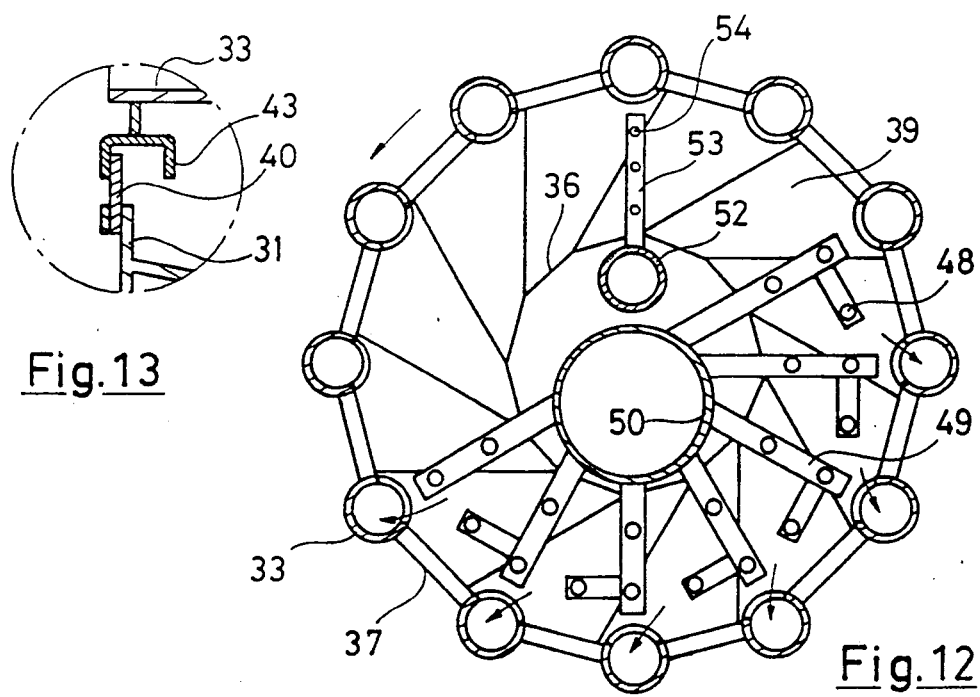
Fig. 13
Fig. 12

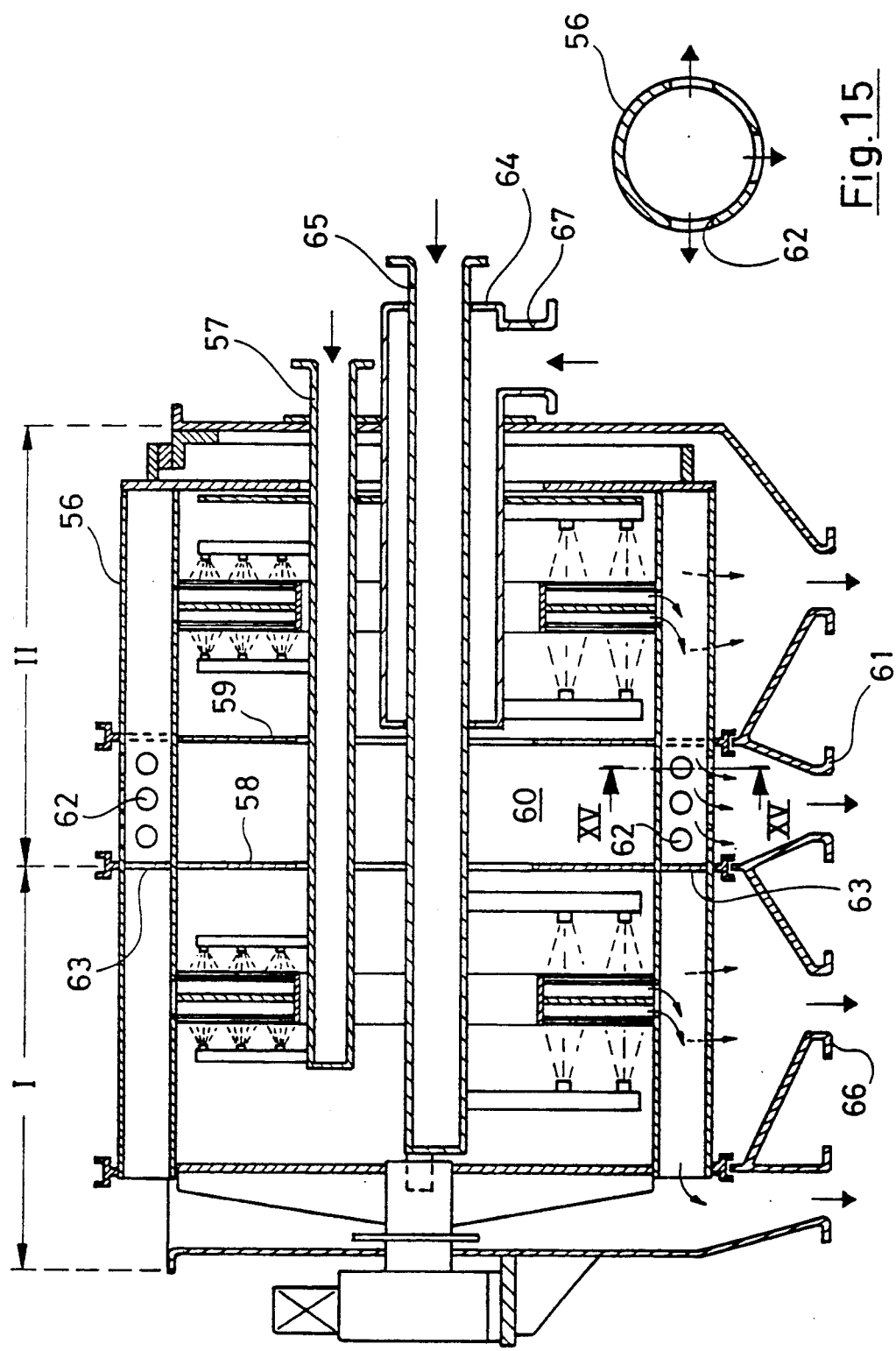

METHOD OF AND DEVICE FOR FRACTIONATING SUSPENSIONS

The present invention relates to a method of fractionating suspensions, preferably containing fibre pulp, the suspension to be fractionated being sprayed in the form of at least one jet against one of the sides of a filter sheet during displacement of the filter sheet and said jet relative to one another, so that the suspension is separated into a fine fraction, which passes through the screen holes of the filter sheet and which contains fine particles, and a coarse fraction, which does not pass through said screen holes and which contains coarse particles and some fine particles. The invention also relates to a device for such a fractionation of suspensions.

In a known method of this kind the filter sheet is circular and is kept fixed in a horizontal position, the suspension being sprayed substantially vertically towards the upper side of the filter sheet during rotation of the jet of the suspension in horizontal direction. The resulting relative displacement between the jet and the filter sheet aims at cleansing the screen holes of the filter sheet, so that these are freed from initial clogging. Such a cleansing effect occurs, but has proved workable only over a limited period of time.

When fractionating it is particularly important that the screen holes are kept free from initial clogging, since these negatively affect the fractionation result. This is so because the sizes of the particles in the coarse and fine fractions are radically changed even with a moderate clogging of the screen holes, so that the intended fractionation cannot be obtained. Therefore, when utilizing the known fractionation method the operation must be stopped regularly for cleansing the screen holes of the filter sheet.

The object of the present invention is to provide a new fractionation method of this general kind, which, during operation efficiently keeps the screen holes clean from initial clogging, whereby stopping to cleanse the screen holes is avoided.

A further object of the present invention is to provide a new fractionation device for accomplishing the new fractionation method.

These objects are obtained by means of a method of the kind initially mentioned, which is characterized primarily by spraying cleansing liquid in the form of at least one jet against the filter sheet, and displacing the filter sheet and said jet of cleansing liquid relative to each other, such that the jet of cleansing liquid hits the screen holes of the filter sheet which have been sprayed upon with suspension.

In this way an advantage is obtained in that the cleansing liquid can be allowed to spray against the filter sheet with a considerably stronger impact pressure than the suspension, since in contrast to the suspension the cleansing liquid is free from relatively coarse particles, which could be pressed into the screen holes of the filter sheet and clog them if the suspension were sprayed at too high a pressure against the filter sheet.

The cleansing liquid is suitably sprayed on the same side of the filter sheet as the suspension if it is primarily required that the liquid concentration of the coarse fraction be kept low. In this case the liquid content of the fine fraction is increased. In the case where the liquid concentration of the coarse fraction is of secondary significance the cleansing liquid is advantageously sprayed on the opposite side of the filter sheet from the suspension, whereby the cleansing effect of the screen holes is further improved.

The cleansing liquid may be sprayed continuously or intermittently against the filter sheet. Intermittent spraying results in a lower dilution of the coarse and fine fractions compared to continuous spraying.

Advantageously, the pressure is kept higher on the coarse fraction side of the filter sheet than on the fine fraction side, whereby the fractionation capacity is increased and the liquid content of the coarse fraction is reduced.

Preferably, the filter sheet is kept substantially vertical and is displaced relative to the jets of suspension and cleansing liquid. In this way, the advantage is obtained that the coarse particles deposited on the filter sheet during the fractionation are continuously removed from the filter sheet with the coarse fraction, when the coarse fraction under the influence of gravity flows off the filter sheet. Therefore, the jets of cleansing liquid can be arranged such that they only hit the screen holes which are not covered by coarse particles, whereby such coarse particles do not run the risk of being pressed by the cleansing liquid into the screen holes of the filter sheet, clogging them.

The invention also relates to a new device for fractionating suspensions, preferably containing fibre pulp, comprising a housing, at least one filter sheet with screen holes located in the housing, spray means for spraying suspension on one side of each filter sheet, means for displacing each filter sheet and the spray means relative to each other, the suspension being separated during operation into a fine fraction, which passes through the screen holes of each filter sheet and which contains fine particles, and a coarse fraction, which does not pass through said screen holes and which contains coarse particles and some fine particles, and outlets in the housing for coarse fraction and fine fraction, respectively. The new fractionation device is primarily characterized in that further spray means are arranged to spray cleansing liquid against each filter sheet for cleansing the screen holes of the sheet, and in that said displacement means are adapted to displace each filter sheet and said further spray means relative to each other, such that during operation the further spray means spray cleansing liquid against the screen holes which have been sprayed with suspension.

Either may each filter sheet be stationary while the spray means are displaceable or vice versa. However, it is preferred that each filter sheet is displaceable while the spray means are stationary, each filter sheet being arranged substantially vertically, which enables the design of a compact and simple fractionation device of high capacity.

Preferably, a substantially horizontal shaft extends into the housing and is rotatably journalled in the housing, each filter sheet being attached to the shaft substantially transversely to it.

Suitably, at least one pair of filter sheets are arranged on the shaft, the spray means for suspension being arranged to spray the outer sides of the filter sheets of each pair of filter sheets.

A plurality of embodiments of the fractionation device according to the invention are possible. In the following paragraphs the invention will be explained more exactly by a description of a number of embodiments, with reference to the accompanying drawings, in which.

Figure 1:
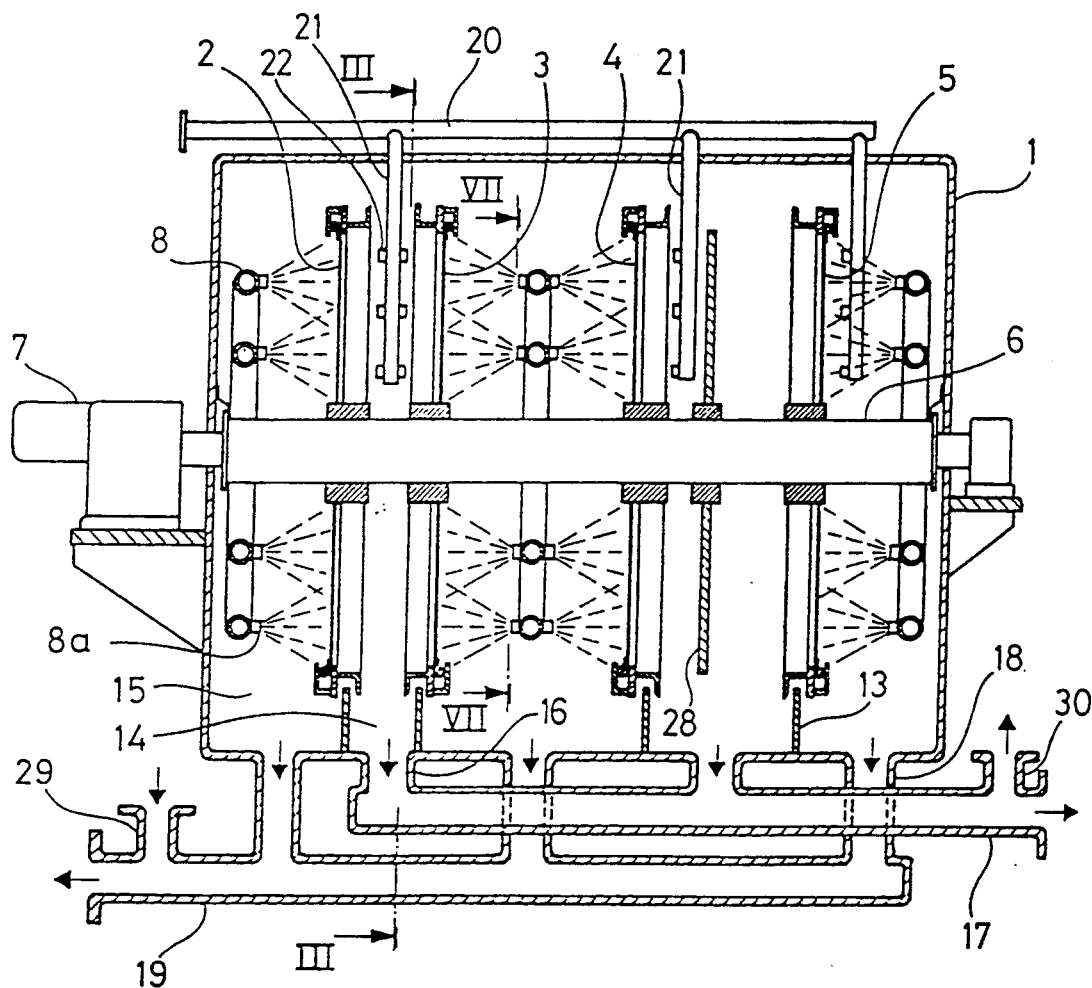
FIG. 1 shows a longitudinal sectional view through a preferred embodiment of the fractionation device according to the invention.
Figure 2:
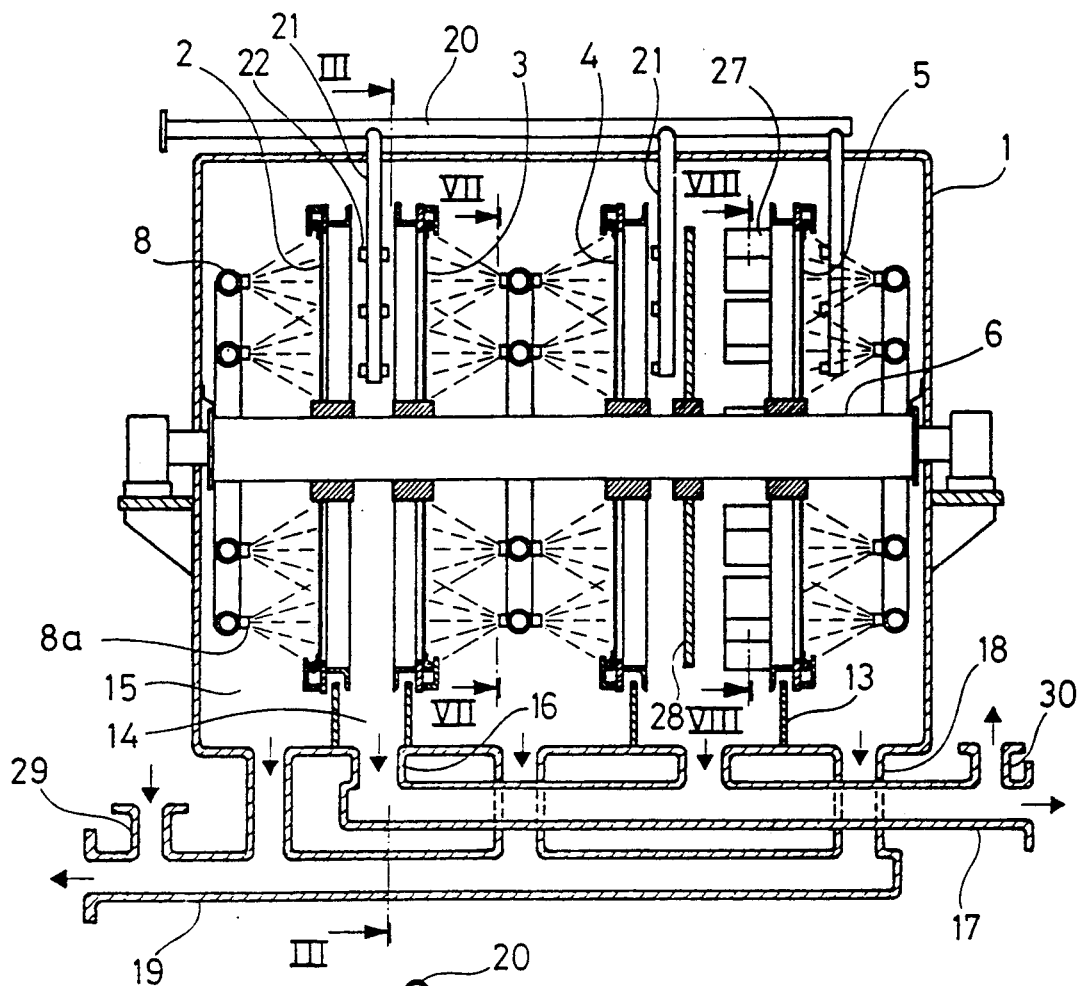
FIG. 2 is longitudinal sectional view of an alternative embodiment of the invention in which a drive motor is replaced by hydraulic drive means.
Figure 3:
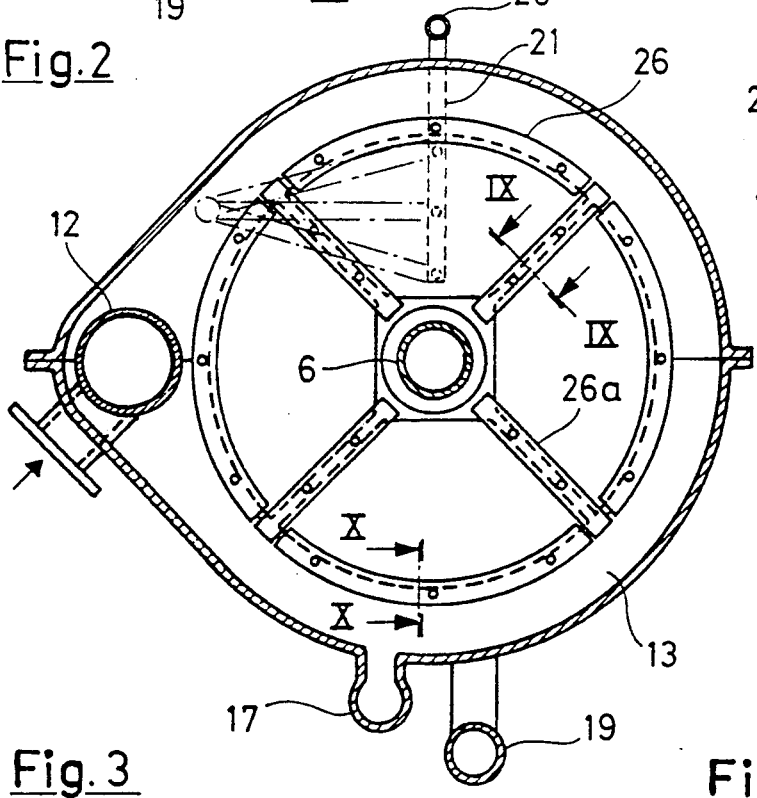
FIG. 3 shows a sectional view along the line III—III of FIGS. 1 and 2.
Figure 4:
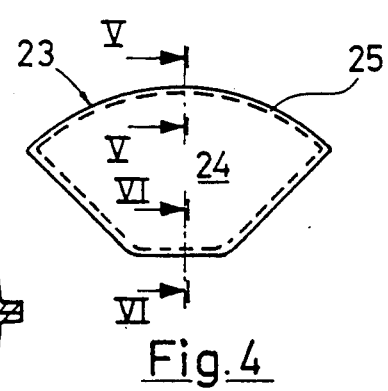
Figures 5, 6:
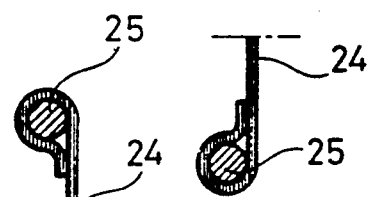
Figure 16:
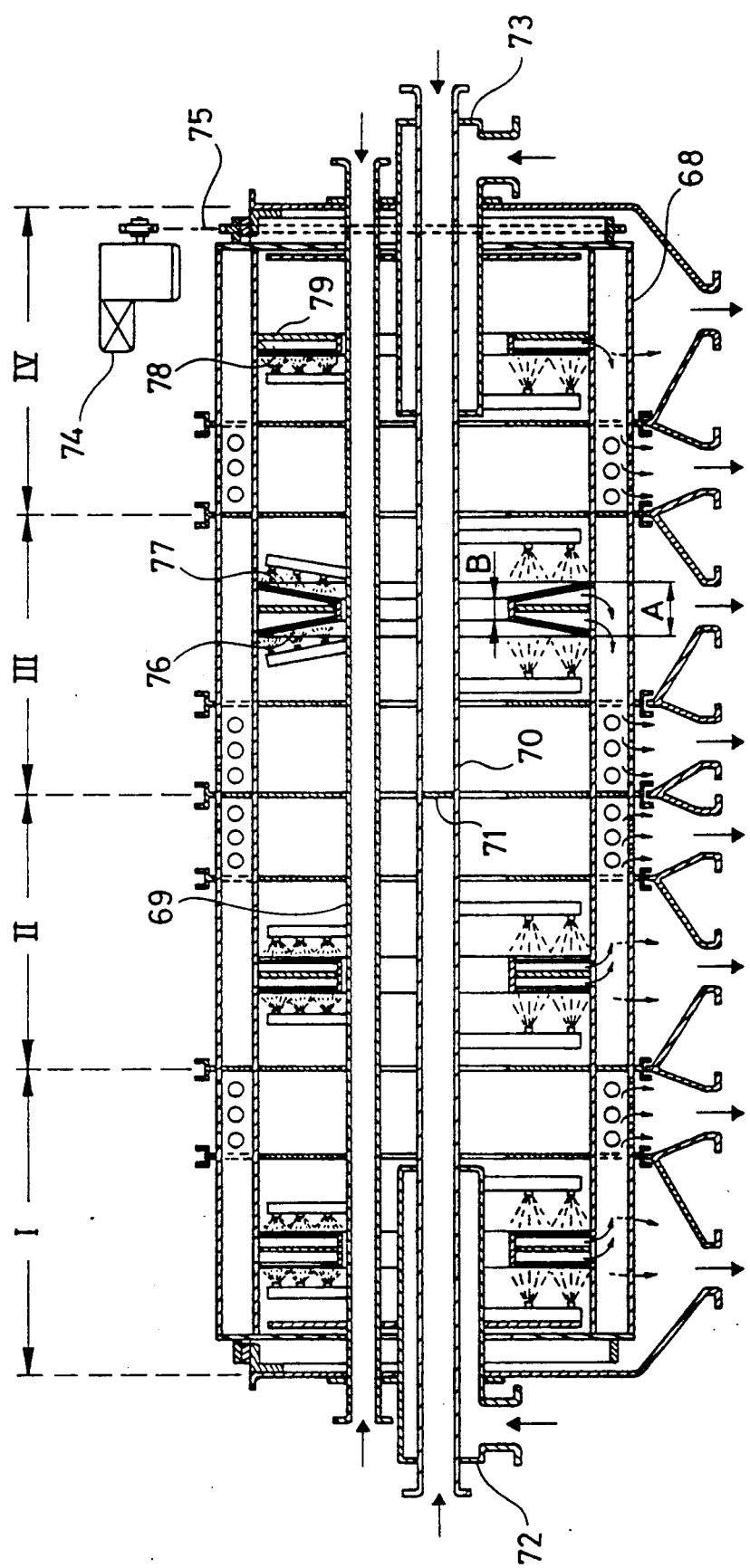

FIG. 4 shows a cassette with a screen cloth for a filter sheet in the device according to FIGS. 1 and 2, FIGS. 5 and 6 show sections along the lines V—V and VI—VI, respectively, of FIG. 4, FIG. 7 shows spray means for suspension according to a section along the line VII—VII in FIGS. 1 and 2, FIG. 8 shows a sectional view along the line VIII—VIII of FIG. 2, FIGS. 9 and 10 show sectional views along the lines IX—IX and X—X, respectively, of FIG. 3, FIG. 11 shows a longitudinal sectional view through another embodiment of the fractionation device according to the invention, FIG. 12 shows a sectional view along the line XII—XII of FIG. 11, FIG. 13 shows in detail a sealing arrangement of the device according to FIG. 11, FIG. 14 shows a longitudinal sectional view through two fractionation devices according to FIG. 11, which are assembled to a compact fractionation plant, FIG. 15 shows a section along the line XV—XV of FIG. 14, FIG. 16 shows a longitudinal sectional view through four fractionation devices according to FIG. 11, which are assembled to a compact fractionation plant.

Figure 17:
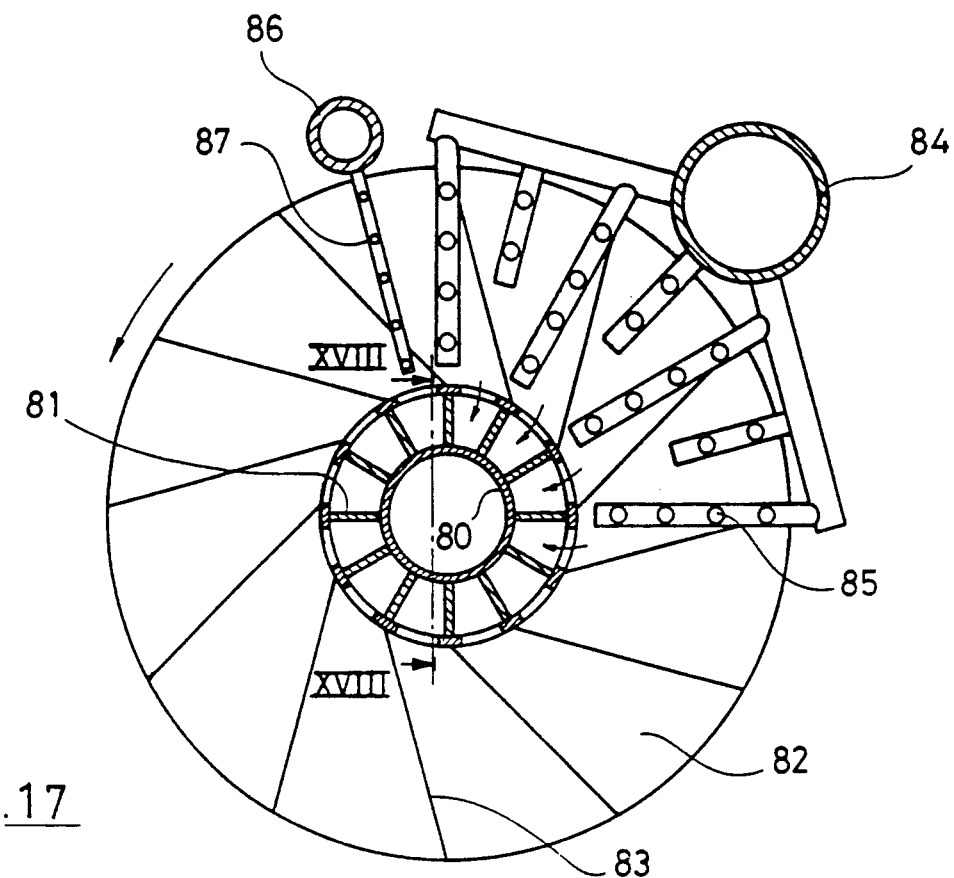
Figure 18:
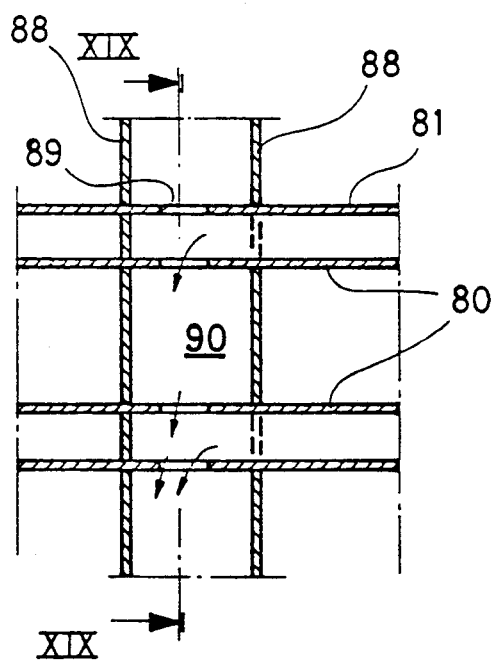
Figure 19:
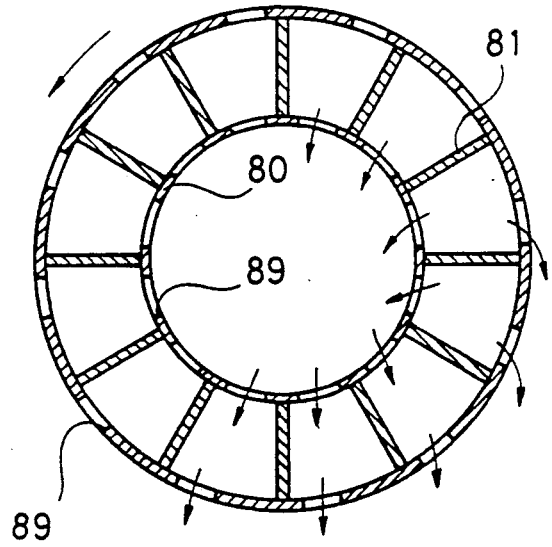
Figure 20:
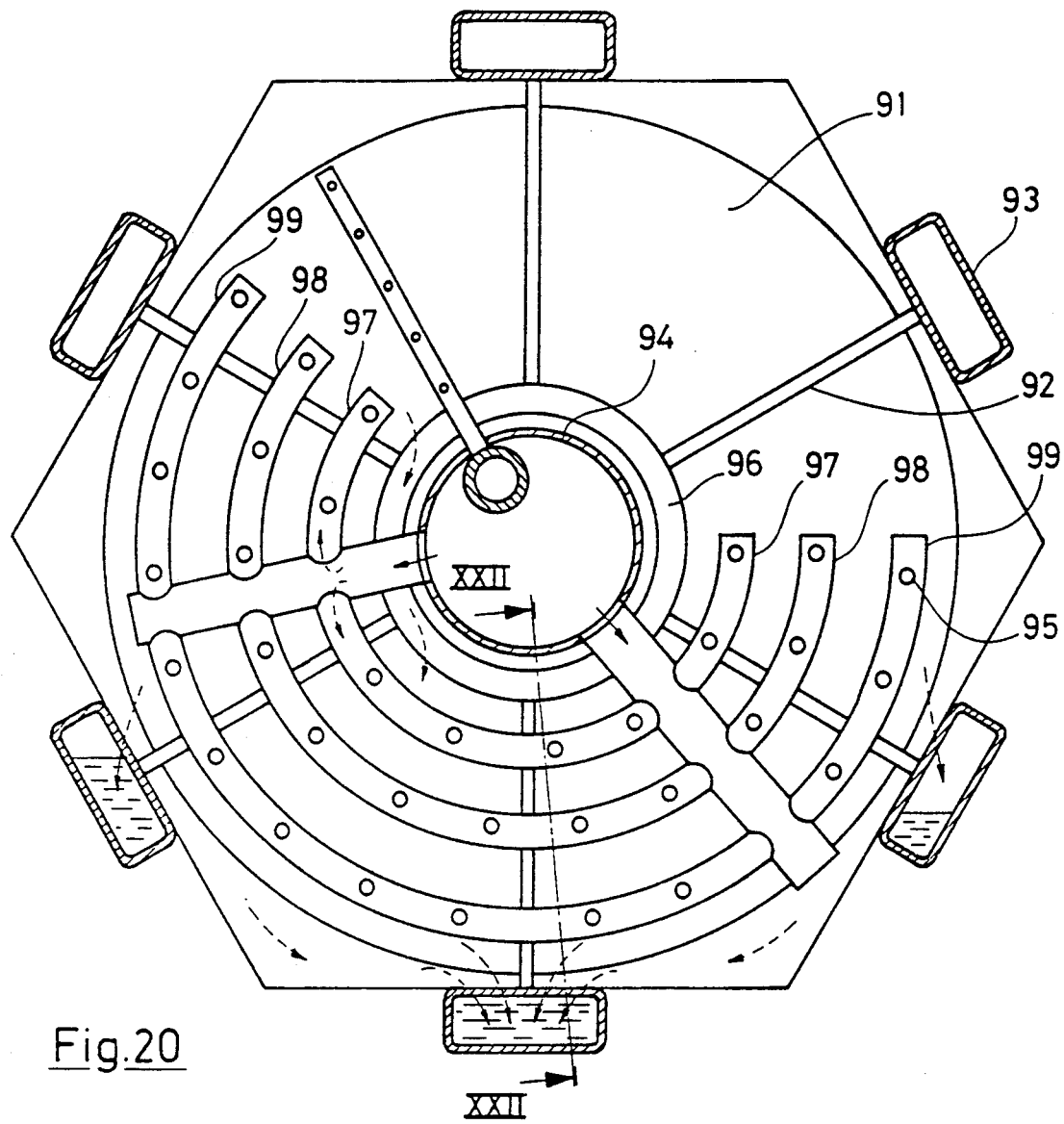
Figure 21:
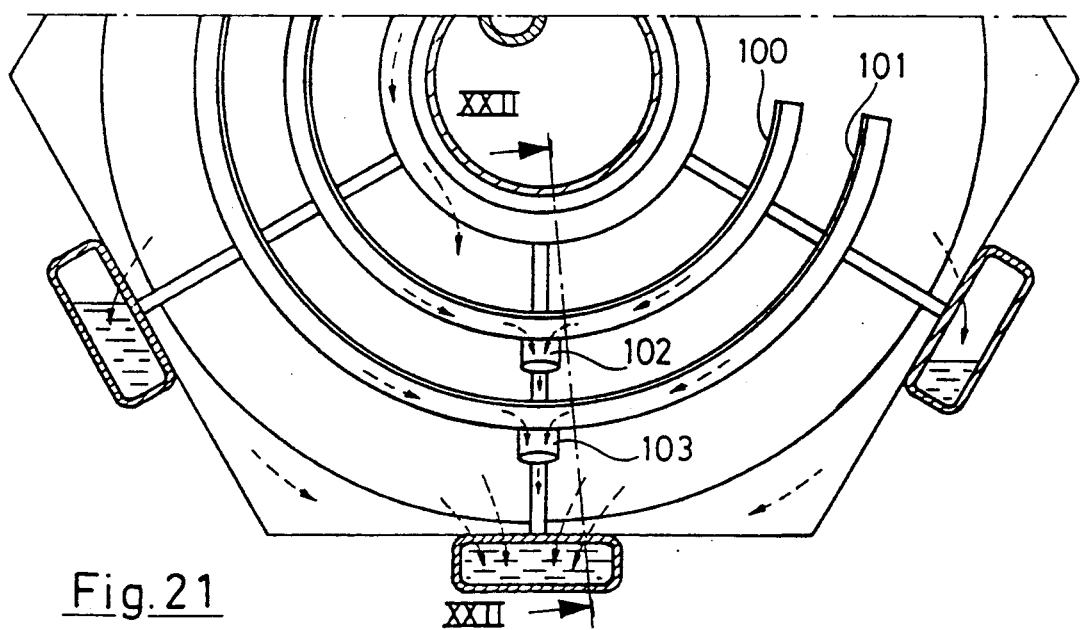
Figure 22:
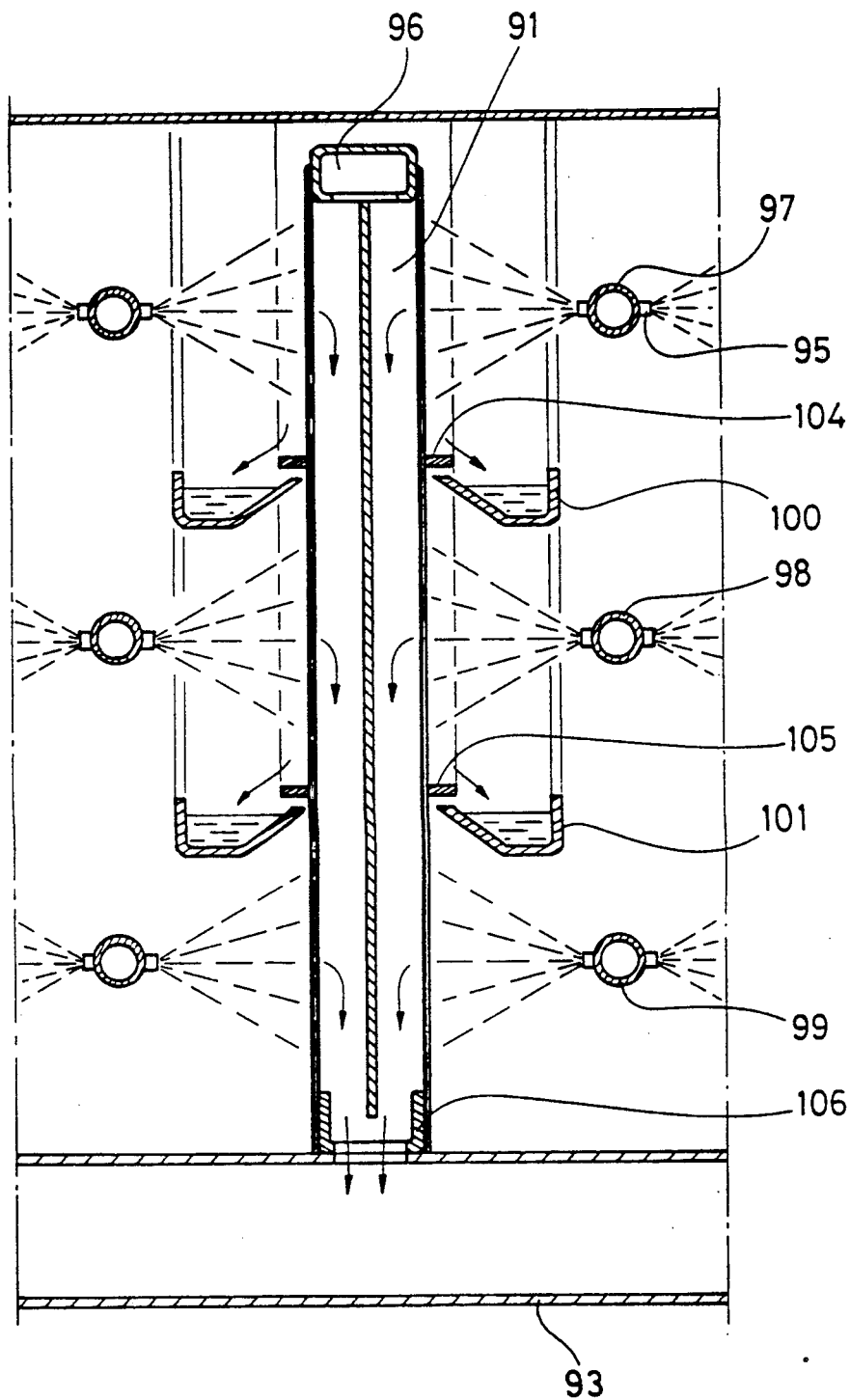
Figure 23:
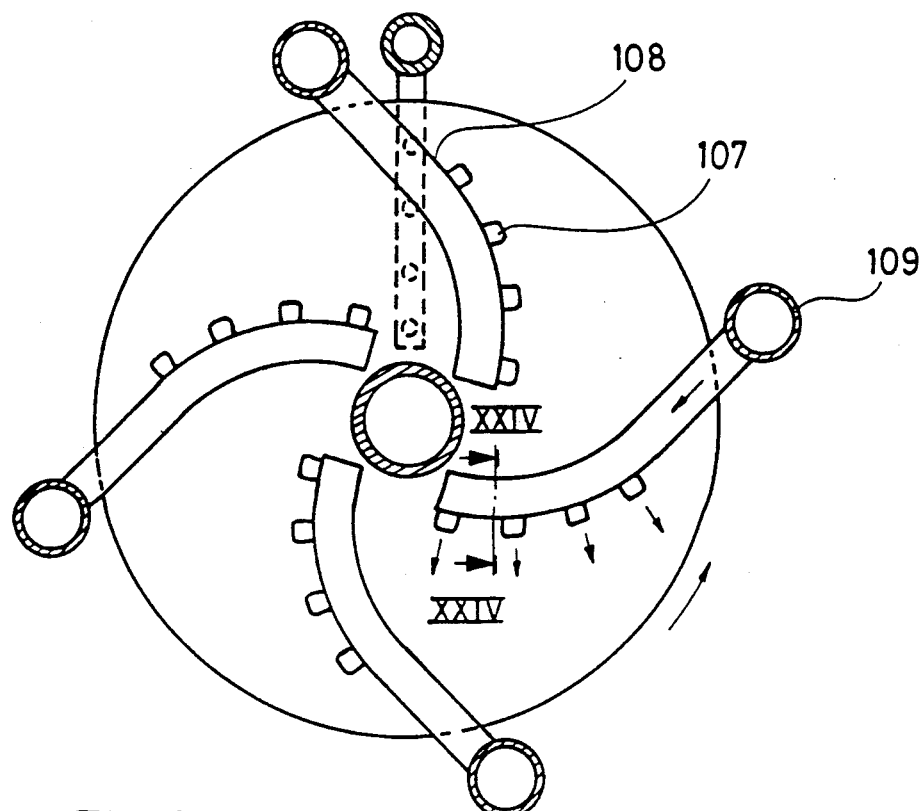
Figure 25:
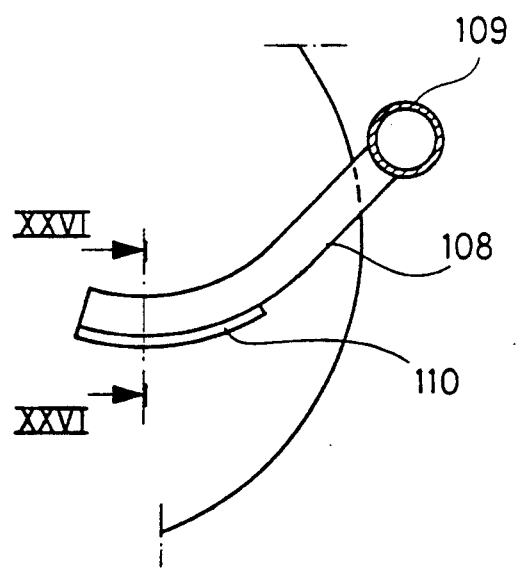
Figures 24, 26:
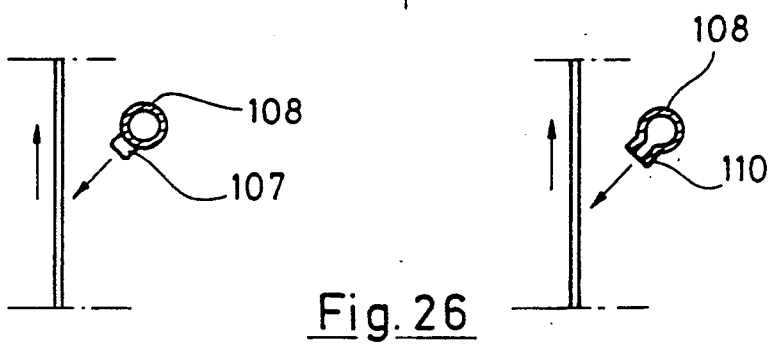
Figure 27:
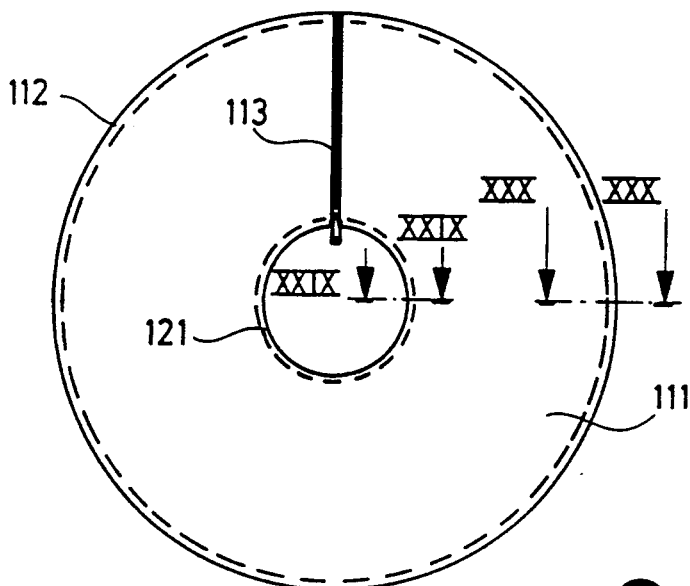
Figure 28:
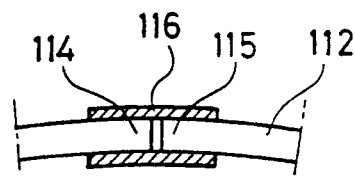
Figures 29, 30:
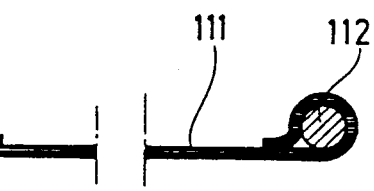
Figure 31:
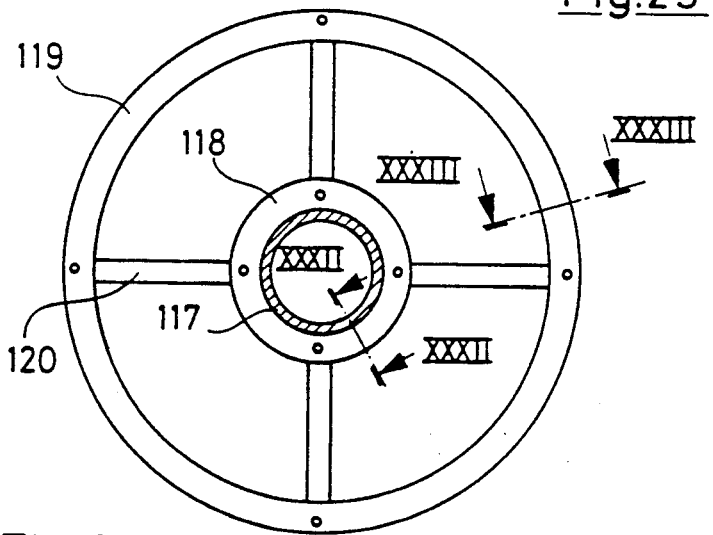
Figures 32, 33:
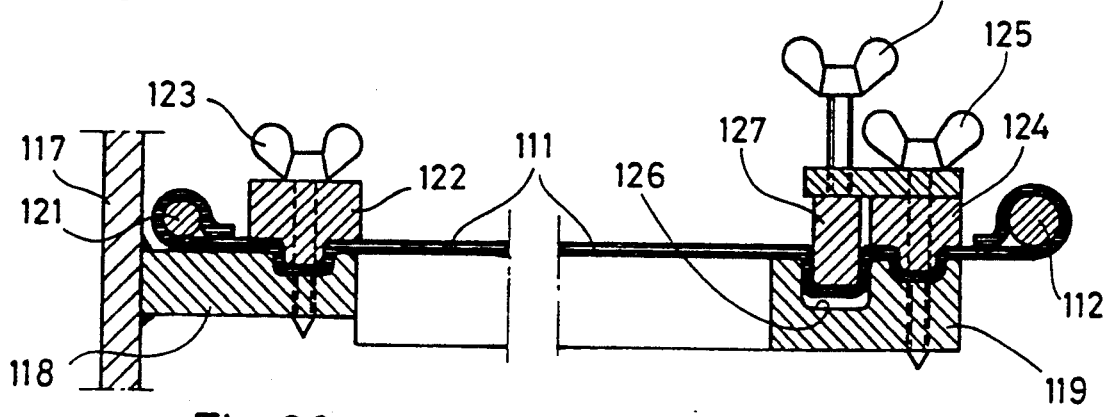

FIG. 17 shows a further embodiment of the fractionation device according to the invention, FIG. 18 shows a section along the line XVIII—XVIII of FIG. 17, FIG. 19 shows a section along the line XIX—XIX of FIG. 18, FIGS. 20 and 21 show a modification of the fractionation device according to FIG. 11, FIG. 22 shows a section along the lines XXII—XXII of FIGS. 20 and 21, FIG. 23 shows an arrangement of spray means for suspension for a fractionation device according to the invention, FIG. 24 shows a section along the line XXIV—XXIV of FIG. 23, FIG. 25 shows a modified spray means for suspension of the arrangement according to FIG. 23, FIG. 26 shows a section along the line XXVI—XXVI of FIG. 25, FIG. 27 shows a modified arrangement of a screen cloth for a filter sheet according to the invention, FIG. 28 shows a part of the arrangement according to FIG. 27, FIGS. 29 and 30 show sections along the lines XXIX—XXIX and XXX—XXX, respectively, of FIG. 25, FIG. 31 shows a filter disc framework, on which the screen cloth according to FIG. 27 is intended to be mounted, and FIGS. 32 and 33 show sectional views along the lines XXXII—XXXII and XXXIII—XXXIII, respectively, of FIG. 31 with a mounted screen cloth.

The fractionation device shown in FIG. 1 comprises a housing 1, in which two pairs of filter discs 2, 3 and 4, 5, respectively, are attached to a horizontal shaft 6 transversely to and coaxially with the shaft. The shaft 6 is rotatably journalled in the housing 1 and coupled to a drive motor 7. A plurality of spray means 8 for suspension to be fractionated is arranged to spray the outer sides of the filter discs of the two pairs of filter discs 2, 3 and 4, 5, respectively. At each filter disc a number of the spray means 8 are arranged on a radially outer circular pipe 9 and a radially inner circular pipe 10 (FIG. 6), which circular pipes 9, 10 are situated coaxially with the filter discs. The pipes 9, 10 at each filter disc are connected via an assembly pipe 11 to a stationary distribution pipe 12 extending parallel to the shaft 6 and radially outside the filter discs 2-5. Each spray means 8 is provided with at least one spray nozzle 8a, which is directed towards the screen openings of the filter disc situated closest to the spray nozzle. The spray means 8 which are situated between the filter discs 3 and 4 are provided with double opposite directed spray nozzles 8a.

In a bottom space in the housing 1, there are partition walls 13 extending from the housing to the filter discs 2-5. In said bottom space the partition walls 13 form drainage chambers 14 for fine fraction. These chambers are situated between two adjacent partition walls 13 at each pair of filter discs 2, 3 and 4, 5. Drainage chambers 15 for coarse fraction are situated axially outside said adjacent partition walls 13. The drainage chambers 14 for fine fraction are connected via bottom outlets 16 to a drain pipe 17 and the drainage chambers 15 for coarse fraction are connected to a drain pipe 19 via bottom outlets 18.

A stationary distribution pipe 20 for cleansing liquid extends parallel to the shaft 6 and above the filter discs 2-5. From the distribution pipe 20, pipes 21 extend vertically down between the filter discs 2 and 3, and 4 and 5, respectively. The pipes 21 are provided with stationary spray means 22, which are directed towards the filter discs. Alternatively, the pipes 21 may be arranged to oscillate as indicated in FIG. 3.

Each filter disc 2-5 comprises four screen members in the form of exchangeable cassettes 23 (FIG. 4). Each cassette 23 consists of a screen cloth 24 and a frame 25, which extends through tubular channels formed by the screen cloth 24 (FIGS. 5 and 6) and keeps the screen cloth stretched. In each filter disc the cassettes 23 are attached to an annular peripheral bar 26 and four spokes 26a by means of thread joints (shown in FIGS. 9 and 10). Alternatively, each filter disc may be designed with more or less cassettes than four depending on the diameter of the filter discs.

During operation the filter discs 2-5 are rotated by the drive motor 7 at the same time as suspension is continuously supplied to the spray means 8 via the distribution pipe 12, the assembly pipes 11 and the pipes 9 and 10, so that the rotating filter discs 2-5 are sprayed with suspension. In this manner, the suspension is separated into a fine fraction, which passes through the screen holes of the screen cloths 24 of the filter discs and which contains fine particles, and a coarse fraction, which does not pass through the screen holes and which contains coarse particles and some fine particles. The coarse fraction flows down along the filter discs to the drainage chambers 15 and flows further through the bottom outlets 18 to the drain pipe 19. The fine fraction is collected in the drainage chambers 14 and flows therefrom via the bottom outlets 16 to the drain pipe 17. Cleansing liquid, preferably water, is supplied to the spray means 22 continuously or intermittently via the distribution pipe 20 and the pipe 21 and is sprayed under a relatively high pressure against the screen cloth in a direction towards the fine fraction sides of the filter discs. In this manner the screen holes are regularly cleansed from initial cloggings.

In an alternative arrangement, shown in FIGS. 2 and 8, the drive motor 7 may be replaced by an arrangement of buckets 27. As shown in FIGS. 2 and 8, the buckets 27 are arranged at the fine fraction side of at least one filter disc, are evenly distributed along the circumference of said one filter disc, and are oriented, so that during operation the buckets which move downwards will receive and keep fine fraction, while the buckets which move upwards will be emptied of fine fraction. In a filter disc provided with such buckets 27, the spray means 22 for cleansing liquid should be arranged on the coarse fraction side of the filter disc, as shown at the filter disc 5 in FIG. 2.

If the suspension is sprayed under such a high pressure against the filter discs that there might be a risk of the generated fine fraction hitting the opposite filter discs, a protecting circular partition wall may be arranged between the filter discs of each pair of filter discs. Such a partition wall 28 extends between and parallel to the filter discs 4 and 5 in FIGS. 1 and 2.

The fractionation devices according to FIGS. 1-10 described above have a simple construction and are preferably operated with the same pressure on the coarse fraction sides and the fine fraction sides of the filter discs. Alternatively, however, it is quite possible to seal the coarse fraction sides from the fine fraction sides to enable operation of the fractionation device with a pressure difference between the coarse and fine fraction sides, whereby the capacity of the fractionation device can be increased. In such a case a source of overpressure may be connected to an inlet 29 in the drain pipe 19 for coarse fraction and/or a source of underpressure may be connected to an inlet 30 in the drain pipe 17 for fine fraction. A drawback with this alternative, however, is that each filter disc would need to be sealed against the housing 1 by means of some kind of sealing arrangement, which would make the fractionation device more expensive and increase the risk of breakdowns because of damaged seals.

The fractionation device shown in FIG. 1 comprises a housing 31, in which three pairs of annular filter discs 32 are attached parallel to each other and to twelve horizontal drain pipes 33 for fine fraction. The latter are arranged concentrically and evenly distributed around the filter discs 32 and form a drum shaft 34, which is rotatably journalled in the housing 31 and coupled to a drive motor 35. The filter discs 32 are united with each other in pairs by means of walls 36 and 37, so that a space 38 for fine fraction is formed between the filter discs of each pair.

The space 38 for fine fraction of each pair of filter discs 32 is divided into twelve cells 39, which are evenly distributed around the circumference of the filter discs. The twelve cells 39 communicate with their respective twelve drain pipes 33. The arrangement of the cells 39 prevents that a too large an amount of fine fraction, which is in the spaces 38, overloading one or more of the drain pipes 33 which momentarily are the lowest during the rotation of the drum shaft. This avoids giving the fine fraction time to fill the fine fraction space 38, which would worsen the fractionation result, since the coarse fraction would have a larger concentration of fine particles. However, it would be possible to design the filter discs without cells if the flow of liquid through the fractionation plant is kept low, such that the capacity of a single drain pipe 33 is sufficient to continuously empty the fine fraction space 38 of generated fine fraction. In the fine fraction spaces 38 there are annular partition walls 55 arranged parallel to the filter discs 32 to prevent the created fine fraction at one of the filter discs 32 of a pair of filter discs from disturbing the fractionation at the opposite filter disc.

The drum shaft 34 is provided with a gable 39a, which via an annular gasket 40 between the gable 39a and the housing 31 separates the interior of the housing into a coarse fraction chamber 41, in which the filter discs 32 are situated, and a fine fraction chamber 42, into which the drain pipes 33 open. The annular gasket 40 is attached to the housing 31 and seals against an annular rail 43, which surrounds the drain pipes 33 and is attached to these pipes (FIG. 13). In the fine fraction chamber 42 there is an inlet 44 for connection to a source of sub-pressure and in the coarse fraction chamber 41 there is an inlet 45 for connection to a source of overpressure. The coarse and fine fraction chambers 41, 42 have bottom outlets 46 and 47, respectively.

A plurality of spray means 48 for the suspension are arranged to spray the outer sides of the filter discs 32 of the three pairs of filter discs. At each filter disc 32 a number of the spray means 48 are arranged on seven radial pipes 49 (FIG. 12). The pipes 49 are connected to a stationary distribution pipe 50 for supplying suspension extending through the central holes of the annular filter discs 32.

The distribution pipe 50 at one of its ends is provided with an outlet 51 in the coarse fraction chamber 41 for avoiding sedimentation of particles in the distribution pipe 50. A stationary distribution pipe 52 for supplying cleansing liquid extends through the central holes of the annular filter discs 32. From the distribution pipe 52, pipes 53 extend vertically upwardly along the coarse fraction sides of the filter discs. The pipes 53 are provided with stationary spray means 54, which are directed towards the filter discs 32.

The fractionation plant shown in FIG. 14 is an assembly of two fractionation devices of the kind shown in FIG. 11. Here, the fractionation takes place in two stages. For instance, the suspension may first be fractionated by means of one of the fractionation devices in a first stage I, whereafter the obtained coarse fraction in stage I is fractionated by means of the second fractionation device in a second stage II. By this technique the coarse fraction obtained in stage II will have a relatively low concentration of fine particles.

The fractionation devices according to stage I and II have common drain pipes 56 for fine fraction, which form a drum shaft, and a common distribution pipe 57 for supplying cleansing liquid. Two annular partition walls 58 and 59 between the drain pipes 56 define a drainage chamber 60 for fine fraction from the second stage II. The drainage chamber 60 is provided with a bottom outlet 61 and communicates with the interior of the drain pipes 56 via holes 62 in the drain pipes 56 (FIG. 15). The drain pipes 56 are provided with partition walls 63, which prevent communication between the interior of the drain pipes 56 in stage I and stage II. A distribution pipe 64 for supplying suspension to stage II surrounds coaxially a distribution pipe 65 for supplying suspension to stage I.

If the fractionation plant according to FIG. 14 is desired to be utilized to produce a coarse fraction of a relatively low concentration of fine particles, coarse fraction is pumped from a coarse fraction outlet 66 in stage I to an inlet 67 in the distribution pipe 64 in stage II.

The fractionation plant shown in FIG. 16 is an assembly of two fractionation plants of the kind shown in FIG. 14, the fractionation taking place in four stages I-IV. Analogous to the fractionation devices according to FIG. 13 the fractionation devices according to stages I-IV in FIG. 15 have common drain pipes 68 for fine fraction and a common distribution pipe 69 for supplying cleansing liquid. The fractionation devices according to the stages II and III also have a common distribution pipe 70 for supplying suspension. A partition wall 71 in the distribution pipe 70 prevents communication between the interior of the distribution pipe 70 in stages II and III. Distribution pipes 72 and 73 for supplying suspension to the stages I and IV, respectively, are arranged opposite to each other at the ends of the distribution pipe 70 and surround the distribution pipe 70 coaxially. A drive motor 74, by means of chains or belts 75, is connected to the drum shaft formed by the drain pipes 68 for rotation of this drum shaft.

In stage III there is shown tow filter discs 76 and 77, the surfaces of which converge slightly towards each other in direction towards the centre of the filter discs 76, 77, i.e. the axial distance A between the radial outermost edges of the filter discs 76, 77 is larger than the distance B between the radially innermost edges of the filter discs 76, 77. Thus the two filter discs 76, 77 take the shape of an hour-glass. By this shape a more uniform distribution of the flow of the coarse fraction along the filter discs is achieved, than by parallel surfaces of the filter discs, which by tests has proved to be advantageous in certain applications.

In stage IV there is shown a pair of discs 78 and 79, only one 78 of which is provided with screen holes, while the other 79 is completely tight. Such a pair of discs 78, 79 may be utilized as needed for meeting the fractionation capacity required. For instance, stage IV may include four pairs of filter discs and one such pair of discs 78, 79.

FIGS. 14 and 16 there is shown for reasons of simplicity only one pair of discs in each fractionation stage. Of course, each stage may include an optional number of pair of discs, for instance five in a first stage, four in a second stage, three in a third stage and two in a fourth stage.

The fractionation plants according to FIGS. 14 and 16 may, for instance, be utilized for separating the valuable fibres (coarse particles) from printing ink (fine particles) when producing paper pulp from waste paper. In this case, for instance, an efficiency of 60% may be obtained in a first fractionation stage, i.e. there is 40% of the printing ink left in the fibre suspension (coarse fraction), which leaves the first stage. Then, this fibre suspension may be fractionated in a second stage, whereby perhaps there is 20% of the printing ink left in the fibre suspension leaving the second stage. In this way the fibre suspension may be cleaned from printing ink in further stages, so that the fibre suspension finally achieves a satisfactorily low concentration of printing ink.

The fractionation plants according to FIGS. 14 and 16 may also be utilized for fractionating various media and/or be equipped with various sizes of the screen holes in the respective fractionation stages for producing fractions with various sizes of particles, since the fractionation stages can be operated independently of each other.

Alternatively, a plurality of fractionation devices of the kind shown in FIGS. 1 or 2 may be assembled in several fractionation stages in the same way as described above for the fractionation device according to FIG. 11.

In FIG. 17 there is shown a filter disc divided into cells, which is attached to a tubular central shaft 80, around which twelve axial drain pipes 81 for fine fraction are centrally arranged in the filter disc. The interior of the twelve pipes 81 communicate with twelve cells 82, respectively, in the filter disc. Each cell 82 has straight wall portions 83 extending in direction radially outwards and forwards in the rotation direction of the filter disc. A distribution pipe 84 for supplying suspension extends parallel to the shaft 80 and is situated radially outside the filter disc. A plurality of spray means 85 are connected to the distribution pipe 84 and are arranged for spraying about a quadrant of one side surface of the filter disc. A distribution pipe 86 for cleansing liquid is provided with spray means 87 arranged to spray the same side of the filter disc as the spray means 85, and is situated above the shaft 80.

If the filter disc according to FIG. 17 is utilized in several fractionation stages two adjacent stages are separated by means of partition walls 88 (FIG. 18) analogous to the above described in connection with the fractionation plants according to FIGS. 14 and 16. The interior of the pipes 81 in one of said adjacent stages communicates via holes 89 in the pipes 81 with a drainage chamber 90 for fine fraction situated between the partition walls 88.

An advantage with a fractionation device equipped with the filter discs according to FIG. 17 is that in a dismantled state it requires considerably less space during transportation than a fractionation device according to FIG. 11, since the shaft 80 including the drain pipes 81 has a relatively small diameter and the cells 82 of the filter discs can be arranged detachable from the shaft 80. A drawback with the filter discs according to FIG. 17, however, is that their fractionation capacity is relatively low, since during operation only about 25% of the surface of each filter disc can be sprayed with suspension. (If a larger part of the surface of each filter disc is sprayed with suspension the created fine fraction in certain cells 82 cannot flow out into the central drain pipe 81 during a part of the revolution of the filter discs).

The fractionation device shown in FIGS. 20-22 in principle is of the same kind as the fractionation device according to FIG. 12, but has a filter disc with only six cells 91. The cells 91 have radially directed walls 92 and are connected to six drain pipes 93, respectively, for fine fraction. Each drain pipe 93 is connected to two adjacent cells 91. A central distribution pipe 94 for supplying suspension is connected to a plurality of spray means 95, which during operation are arranged to spray a larger surface of the part of the filter disc which is moving downwardly than the part moving upwardly. A turning movement therefore arises from the fine fraction in the cells 91, which results in the filter disc becoming self-rotating, so that a separate drive motor for turning the filter disc is not needed. In certain upper turning positions of the cells 91 the fine fraction can pass the cells 91 downwardly in the filter disc via an annular channel 96 situated between the distribution pipe 94 and the cells 91.

The spray means 95 are arranged on three stationary pipes 97-99 extending in the circumferential direction of the filter disc at different radial distances from the shaft 94. To prevent created coarse fraction flowing downwardly over the filter surface which is sprayed with suspension and there disturbing the fractionation, two stationary guide means in the form of chutes 100, 101 are arranged halfway between the intermediate pipe 98 and the radially innermost pipe 97, and halfway between the intermediate pipe 98 and the radially outermost pipe 99, (FIGS. 21 and 21). In the lowest portion of the chutes 100, 101 there are outlets 102 and 103 for coarse fraction collected by the chutes 100, 101. Two annular circular guide means 104 and 105 are attached to the coarse fraction side of the filter disc coaxially with the filter disc and extend axially a distance across the respective chutes 100, 101 (FIG. 22). The guide means 104, 105 aim at conducting coarse fraction, which flows downwardly over the surface of the filter disc, to the chutes 100, 101.

To reduce the risk of generated fine fraction in the cells 91 flowing backwardly out through the screen holes, an annular chute 106 is arranged along the circumference of the filter disc radially outside the cells 91. The chute 106 conducts the fine fraction to the drain pipes 93, which currently are lowest during the rotation of the filter disc.

In FIGS. 23-26 there is shown an alternative arrangement of the spray means 107 for suspension intended for a fractionation device of the kind shown in FIGS. 1 and 2. The spray means 107 are arranged on four curved pipes 108 connected to four stationary distribution pipes 109, respectively. From the centre of the filter disc each pipe 108 curves outwardly and forwardly relative to the rotational direction of the filter disc. On each pipe 108 a plurality of the spray means 107 is arranged one after the other and directed towards the surface of the filter disc, so that during operation the filter disc is hit by suspension on an elongated area, which like each pipe 108 curves outwards from the centre of the filter disc and forwards relative to the rotational direction of the filter disc. This means that during operation the suspension, which is sprayed against the filter disc, forms a curved wave on said elongated area, which creates a radially outwardly directed component of movement in the flow of the coarse fraction on the surface of the filter disc.

Alternatively, each curved pipe 108 may be provided with a single spray means 110 designed with a long and narrow discharge opening for suspension, which curves along the pipe 108 (FIGS. 25 and 26).

The arrangement described above for spraying a filter disc, such that it is hit by suspension over elongated curved areas, is not limited to the kind of fractionation device shown in FIGS. 1 and 2, but may also be utilized of a modified design in the kind of fractionation devices shown in FIGS. 11-22.

The spray means for suspension can be arranged to spray the filter disc with a jet, which is directed obliquely against the surface of the filter disc (FIGS. 24 and 26). By adjusting the angle of the jet against the filter disc the sizes of the particles in the fine and coarse fractions can be controlled within certain limits, since the smaller the angle of the jet against the filter surface, the smaller the particles which can pass through the screen holes. Suitably, said obliquely adjusted jet is directed backwards relative to the rotational direction of the filter disc.

The screen cloth 111 shown in FIG. 27 has a circular annular shape and is provided with a stretching ring 112, which extends through a tubular channel formed by the screen cloth 111 at its radially outermost edge and which keeps the screen cloth 111 stretched. The screen cloth 111 has two opposite edges, which extend from the centre hole of the screen cloth to the outer periphery of the screen cloth and which are fastened together by means of a fastening means, for instance a chainpull 113. The stretching ring 112 has two ends 114, 115 situated in front of the chainpull 113, which ends 114, 115 are joined by means of a sleeve 116. Alternatively, the stretching ring 112 may consist of several separate parts to facilitate an axial separation of said two opposite edges of the screen cloth 111.

The screen cloth 111 according to FIG. 27 is preferably utilized in a fractionation device of the kind shown in FIGS. 1 and 2 and which thus has a centre shaft 117, to which the filter discs are attached, but may also be utilized in fractionation devices of the kind shown in FIGS. 11-26. Each filter disc has a framework consisting of an inner annular bar 118 and an outer annular bar 119, which are joined to each other by means of four spokes 120 (FIG. 31).

When mounting the screen cloth 111 on the filter disc framework shown in FIG. 31, the chainpull 113 is kept in an open position at the same time as the ends 114, 115 of the stretching ring are separated, so that the screen cloth 111 can be applied on the shaft 117, after which the chainpull 113 is closed and the ends 114, 115 are joined by means of the sleeve 116. The screen cloth 111 is further stretched by pulling a thread 121 extending through a channel formed by the screen cloth 111 at its radially innermost edge, whereafter the ends of the thread 121 are tied together.

Alternatively, the ends of the thread 121 may be fastened to the screen cloth 111 in the vicinity of the chainpull 113 and at mutual sides of this, the screen cloth 111 being stretched by the thread 121 when the chainpull 113 is brought to its closed position. In this case the chainpull 113 should be arranged, such that it closes when pulled towards the centre of the screen cloth 111. In addition, the thread 121 may suitably be elastic or be constituted by a coil spring.

The stretched screen cloth 111 is clamped between the inner bar 118 and an inner clamping ring 122 by means of screw joints 123 and between the outer bar 119 and an outer clamping ring 124 by means of screw joints 125. The clamping rings 122, 124 may be provided with annular protrusions, which cooperate with annular grooves in the bars 118, 119, so that the screen cloth 111 is securely fastened between the clamping rings 122, 124 and the bars 118, 119 (FIGS. 32 and 33). To enable restretching of the clamped screen cloth 111 the outer bar 119 can be provided with a relatively deep annular groove 126, which cooperates with an adjustment ring 127. The depth of penetration of ring 127 into the groove 126 is adjustable by means of adjustment screws 128 (FIG. 33). With the screen cloth 111 extending between the bar 119 and the adjustment ring 127 the screen cloth 111 thus can be further stretched by turning the adjustment screws 128.

All of the components described above of the arrangement according to FIGS. 27-33 for providing the stretching of the screen cloth 111 are only required in those cases where the screen cloth 111 is very thin and flexible. Thus, if the screen cloth 111 is relatively stiff the thread 121 would not be needed. In certain cases neither would the adjustment ring 127. Should the screen cloth 111 be very stiff neither the thread 121 not the clamping ring 112 would be needed and often not the adjustment ring 127. The screen cloth 111 may also be constituted by a plastic material shrinkable by heat, so that the screen cloth 111 can be stretched in a clamped position by heat treatment.

We claim:

1. A device for fractionating suspensions, such as fiber pulp, comprising:
    a housing,
    a substantially horizontal shaft extending in the housing and rotatably journaled in the housing,
    at least one pair of substantially vertical filter sheets having screen holes and attached to the shaft substantially transverse to the shaft,
    spray means adapted to spray suspension against the filter sheets, to separate the suspension into a fine fraction, which passes through the screen holes of the filter sheets and which contains fine particles, and a coarse fraction, which does not pass through said screen holes and which contains coarse particles and some fine particles, said spray means being positioned relative to the filter sheets, such that one of said fine and coarse fractions is formed between the filter sheets of said pair of filter sheets, while the other fraction is formed outside said pair of filter sheets,
    additional spray means for spraying cleansing liquid against the filter sheets, for cleansing the screen holes of the filter sheets,
    means for displacing the filter sheets relative to said additional spray means, such that said additional spray means spray cleansing liquid against the screen holes which have been sprayed with suspension,
    first outlet means for discharging the fine fraction from the housing, and
    second outlet means for discharging the coarse fraction from the housing.

2. A device according to claim 1, wherein the spray means for suspension are positioned to spray the outer sides of said pair of filter sheets.

3. A device according to claim 2, wherein a partition wall extends between and substantially parallel to the filter sheets of said pair of filter sheets.

4. A device according to claim 1, where each filter sheet is substantially circular and arranged coaxially with the shaft.

5. A device according to claim 1, wherein each filter sheet is substantially circular and arranged coaxially with the shaft and wherein said spray means for suspension and said additional spray means for cleansing liquid are connected to a first distribution pipe and a second distribution pipe, respectively, said distribution pipes extending in parallel with said shaft.

6. A device according to claim 5, wherein each filter sheet extends radially outwardly from the shaft.

7. A device according to claim 5, wherein each filter sheet extends radially outwardly from the shaft and the distribution pipes extend radially outside each filter sheet.

8. A device according to claim 7, wherein the housing has a bottom space, in which during operation coarse fraction and fine fraction are collected, and comprising a plurality of partition walls for separating coarse fraction from fine fraction extending from the housing in the bottom space of the housing to the filter sheets and forming drainage chambers for fine fraction and coarse fraction situated between and axially outside two adjacent partition walls at said pair of filter sheets.

9. A device according to claim 8, wherein said means for displacing the filter sheets comprises a plurality of buckets arranged on the fine fraction side of at least one filter sheet, such that during operation the buckets moving downwardly receive and collect fine fraction, while the buckets moving upwardly are emptied of fine fraction.

10. A device according to claim 9, wherein the additional spray means for cleansing liquid are arranged to spray upon the fine fraction side of the filter sheets.

11. A device according to claim 7, wherein the two filter sheets of said pair of filter sheets are united by means of wall portions, such that a space for fine fraction is formed between said two filter sheets.

12. A device according to claim 11, wherein said space for fine fraction is divided into a plurality of cells, which are evenly distributed around the circumference of the filter sheets, and comprising a plurality of axial drain pipes for fine fraction, the number of which is equal to the number of cells, said drain pipes extending concentrically around the shaft and being situated radially inside the cells, the cells communicating with the interior of the drain pipes.

13. A device according to claim 5, where the shaft forms a hollow drum, the filter sheets being annular and extending within said drum.

14. A device according to claim 13, wherein the two filter sheets of said pair of filter sheets are united by means of wall portions, such that a space for fine fraction is formed between said two filter sheets.

15. A device according to claim 14, wherein a plurality of axial drain pipes for fine fraction extend concentrically around said drum shaft and are situated radially outside each filter sheet, said space for fine fraction communicating with the interior of the axial drain pipes.

16. A device according to claim 15, wherein said drum is provided with a gable and comprising an annular gasket between the gable and the housing which divides the interior of the housing into a coarse fraction chamber, in which the filter sheets are situated, and a fine fraction chamber, into which each axial drain pipe opens.

17. A device according to claim 16, wherein said space for fine fraction is divided into a plurality of cells of the same number as that of the drain pipes for fine fraction, said cells being evenly distributed around the circumference of the filter sheets and communicating with the interior of the respective drain pipes.

18. A device according to claim 17, wherein the interior of each drain pipe communicates with two adjacent cells of said pair of filter sheets.

19. A device according to claim 18, wherein the spray means for suspension are arranged to spray, during operation, a larger surface of the part of the filter sheets which moves downwardly than the part of the filter sheets which moves upwardly.

20. A device for fractionating suspensions comprising:
    a housing,
    a rotatable, substantially horizontal shaft extending within the housing,
    a plurality of substantially vertical filter sheets attached substantially transverse to the shaft,
    suspension spray means, placed between two filter sheets along the shaft, adapted to spray suspension against the surfaces of the filter sheets facing the suspension spray means, such that a coarse fraction develops on the side of the filter sheets against which suspension is sprayed, and a fine fraction develops on the side of the filter sheets against which suspension is not sprayed, cleansing spray means adapted to spray a cleansing liquid against at least one surface of the filter sheets, to cleanse the coarse fraction from the filter sheets, outlets into which the coarse and fine fractions separately are drained from the housing.

21. The device according to claim 20 and comprising means for displacing said filter sheets and said cleansing spray means relative to one another so that said cleansing spray means sprays cleansing liquid against screen holes which have been sprayed with suspension.

* * * * *

UNITED STATES PATENT OFFICE
CERTIFICATE OF CORRECTION

PATENT NO. : 5,124,029
DATED : June 23, 1992
INVENTOR(S) : Roland Fjallstrom and Rune Frykhult It is certified that error appears in the above--identified patent and that said Letters Patent is hereby corrected as shown below:

Col. 3, line 58, change "Fig. 25" to --Fig. 27--.

Col. 5, line 44, change "Fig. 1" to --Fig. 11--.

Col. 7, line 23, change "tow" to --two--.

Col. 11, line 2, change "not" to --nor--.

Signed and Sealed this

Thirty-first Day of August, 1993

*Attest:*

*Attesting Officer*

BRUCE LEHMAN

*Commissioner of Patents and Trademarks*